Oct. 13, 1953  W. A. ANDERSON  2,655,312
ITEM RETAINING MECHANISM FOR ACCOUNTING MACHINES
Filed Dec. 28, 1949  2 Sheets-Sheet 1
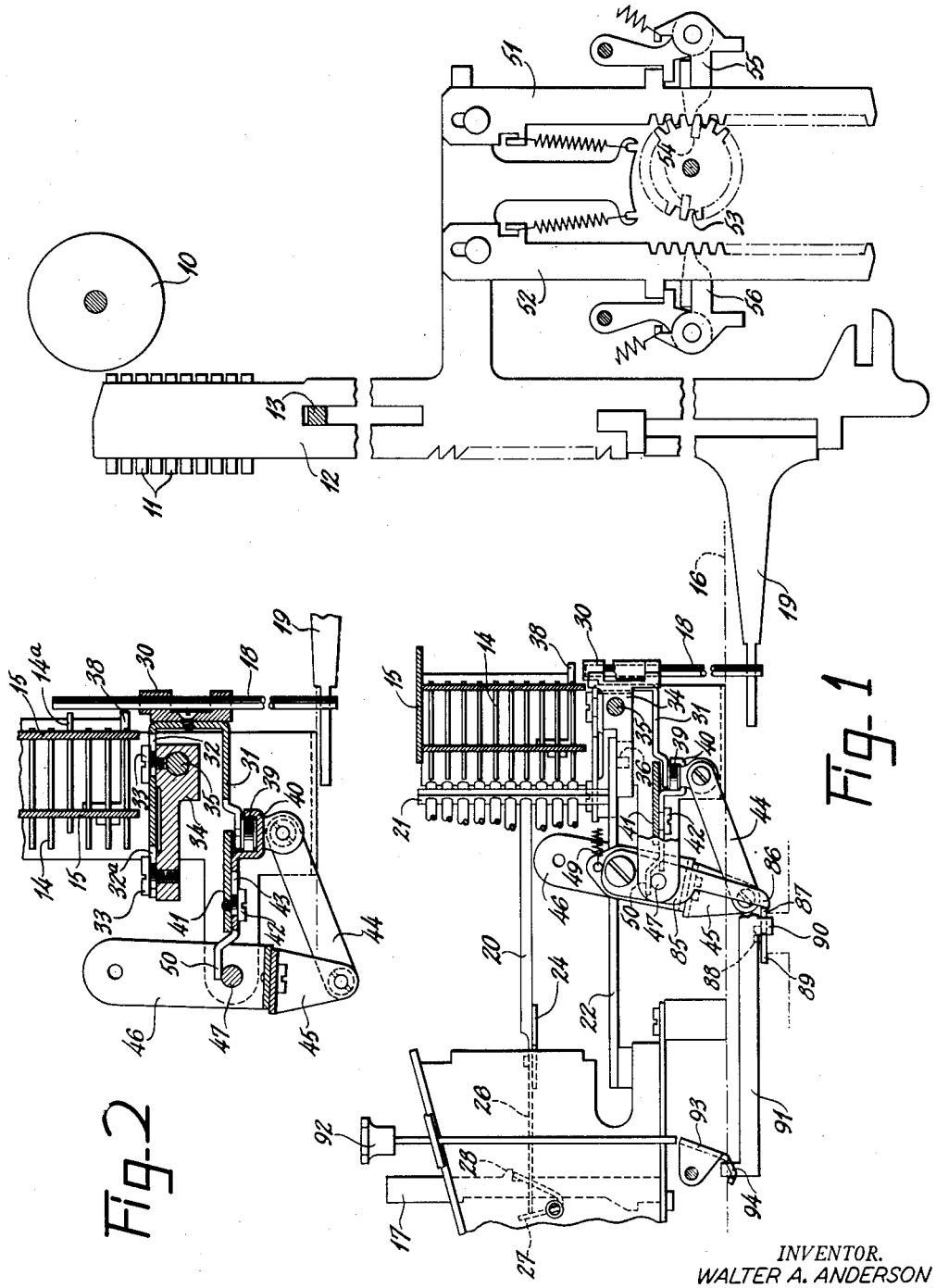
INVENTOR.
WALTER A. ANDERSON
BY Jesse A. Holton
ATTORNEY

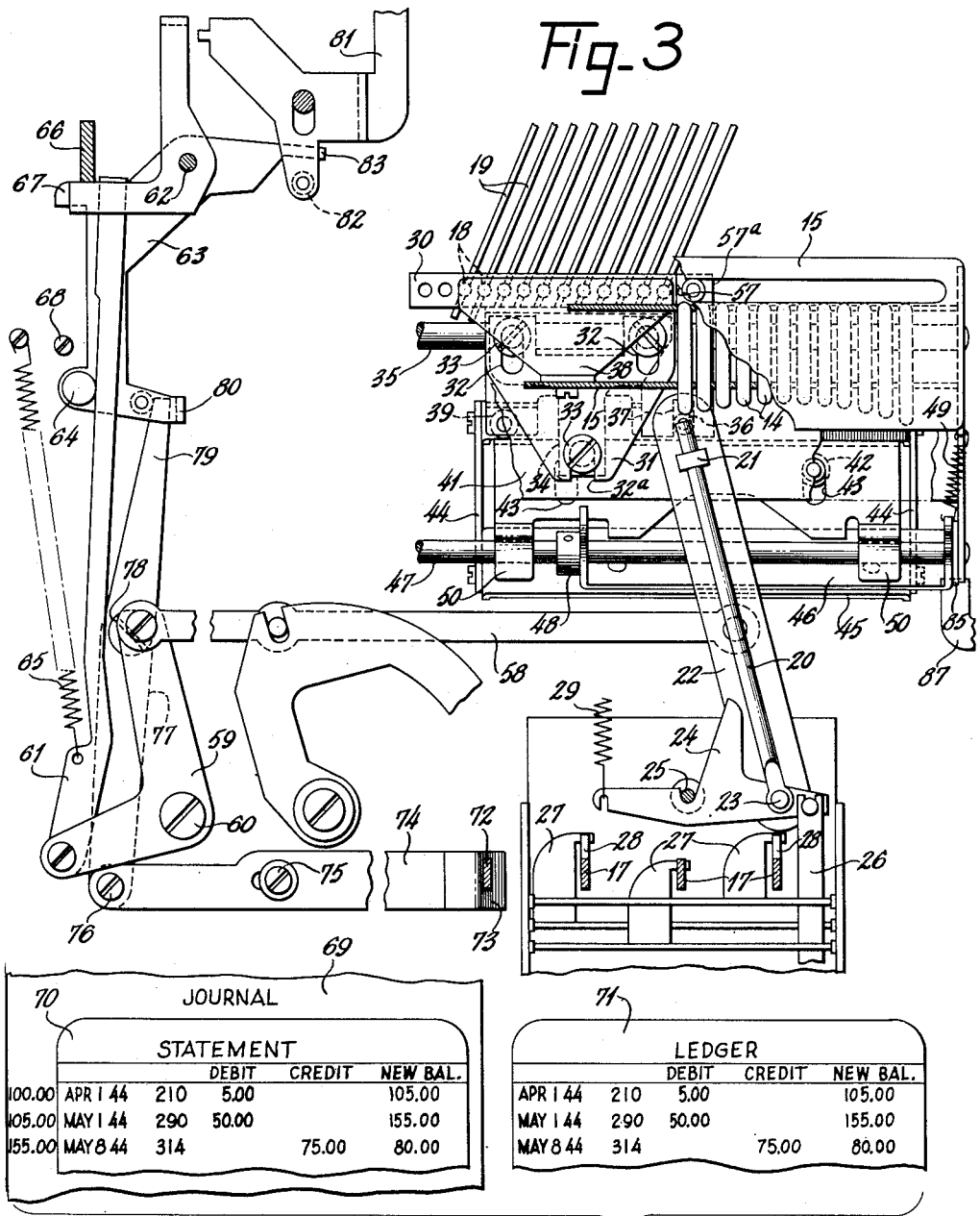

Patented Oct. 13, 1953

2,655,312

UNITED STATES PATENT OFFICE 2,655,312

ITEM RETAINING MECHANISM FOR ACCOUNTING MACHINES

Walter A. Anderson, Bridgeport, Conn., assignor to Underwood Corporation, New York, N. Y., a corporation of Delaware Application December 28, 1949, Serial No. 135,480

4 Claims. (Cl. 235—60.31)

This invention relates to accounting machines, and more particularly to a type of machine used for posting accounts receivable in which work it may be desirable to print a total amount while a key set amount remains indexed, although the invention is not limited to machines for performing this particular type of work.

In posting accounts of the above character, debits and credits are added to and subtracted from an old balance, and a printed statement of the transaction is given the customer. Heretofore, in machines used for this class of work, the accounts were printed as original printing on a ledger form, and a customer's statement and a journal made by means of an interposed carbon paper. In view of the tendency of the carbon copy to smudge in the files, it is more desirable to print the various amounts on the ledger and statement as original printing. To accomplish this, the forms are positioned side by side in the machine carriage and the amounts are imprinted thereon individually. In prior machines, either the re-entering of the various amounts in the keyboard for printing on one or the other of the forms, or the accumulating of the various amounts in different registers contained in the machine and printing the amounts as totals of those registers, is required. In either case considerable machine operating time is required which slows up the work. It is, accordingly, an object of the present invention to provide a mechanism whereby an amount entered on the amount keyboard may be retained while total-taking is performed.

Another object is to provide an improved mechanism which will enable an operator to take a correct total or sub-total from a totalizer while an indexed amount remains set up on the indexing means.

A further object is the development of a simple and inexpensive improvement in total-taking controls wherein an inadvertent operation of a digit indexing key will not affect the accuracy of the total.

Still another object is the provision of a total-taking control mechanism which will, in conjunction with a repeat mechanism, permit the intermixing of repeat amount operations and total or sub-total-taking operations without requiring the re-indexing of the amount after each total or sub-total cycle.

A still further object is to provide a mechanism which will permit an operator to index, during a total-taking cycle, the next amount which is to be entered.

With this and incidental objects in view, the invention consists in certain novel features of construction and combinations of parts, the important elements of which are set forth in appended claims, and a preferred form of embodiment of which is hereinafter described with reference to the drawings which accompany and form part of the specification.

In said drawings:

Figure 1 is a right side elevation showing the present invention and the mechanism associated therewith in normal unoperated position, Figure 2 is a partial side elevation and section showing the parts in the position they occupy when the machine is at mid-cycle during a total-taking operation of the machine, Figure 3 is a top plan view showing the present invention and associated parts in normal unoperated position, Figure 4 is a detail view of the actuator provided for conditioning the machine for total-taking while an amount is set up on the amount keyboard, and Figure 5 illustrates original printing on a ledger and statement as performed on the machine.

The present invention is shown applied to a machine similar to the one disclosed in the United States Patent No. 2,194,270 to Oscar J. Sundstrand, dated March 19, 1940, to which reference may be had for an understanding of features not fully illustrated or described herein.

General description

The machine includes generally a plurality of type bars for computing and printing numerical values which are raised to printing positions by means of springs and returned to their normal or lowered position by means of a conventional motor-driven mechanism. Each of the type bars carries an adding and a subtracting rack cooperating with a totalizer wheel which is provided with transfer devices for effecting the transfer of an amount from one order to another. The machine also includes a keyboard comprising, in part, amount keys for controlling the printing positions of the type bars for item entering operations, a repeat key for manually conditioning the machine for repeat printing an amount entered on the amount keys, a motor bar for actuating the motor driven mechanism and keys for manually controlling sub-total and total-taking operations of the machine. Also included in the machine is a traveling paper carriage automatically tabulated column by column and automatically returned. The carriage includes a platen for supporting the work pieces on which printing is performed, and means for conditioning the machine to effect item entry, machine cycling, repeat printing of an entered item, sub-totalling and totalling operations automatically.

Detailed description

Referring to Figure 1 of the drawings, the work pieces on which printing is to be performed are supported by a platen 10 mounted in the traveling paper carriage (not shown). Printing is accomplished by means of type 11 carried on type bars 12 slidably supported on a shaft 13, rigid in the machine frame (not shown), for vertical movement to printing positions under the urge of springs (not shown). The extent of the vertical movement of the type bars 12 during an item entering operation is controlled by stops 14, slidably supported in a frame 15 fixed to the machine base indicated generally by the dot and dash line 16, that are moved by amount keys 17, Figures 1 and 3, into the path of movement of vertically disposed rods 18 connected to arms 19 of the type bars 12. Movement of the stops 14 is effected by means identical with those disclosed in the Patent 2,194,270 referred to, said means including, generally, rods 20 slidably supported in an upstanding bar 21 fixed on a swinging arm 22 pivoted on the machine frame. The rods 20 are connected at 23, Figure 3, to arms 24, pivoted on a vertically disposed shaft 25 and connected by means of links 26 with cranks 27 pivoted in the machine frame. A projection 28 on the keys 17 overlies the cranks 27 so that upon the depression of the keys 17 and rocking of the cranks 27 thereby the links 26, acting to pivot the arms 24, move the rods 20 rearwardly to strike their associated stop 14 and move it to its extended position as is illustrated at 14a, Figure 2. Springs 29 normally urge the rods 20 forwardly and clear of the stops 14, and sustain the keys 17 in their normally raised position. The stops 14 are arranged in their supporting frame 15 in vertical rows, one row for each of the amount keys 17, and in columns transversely therein, one column for each of the type bars to the numerical computing capacity provided in the machine.

The vertically disposed rods 18 are slidably supported in a block 30 fixed to a bracket 31 mounted for movement forwardly and rearwardly, by means of slots 32 and 32a provided therein to receive studs 33, on a block 34 supported for movement transversely on a shaft 35 rigid in the frame 15. Also, the rods 18 are normally positioned to the left of the stops 14 by means of a pin 36 in the swinging arm 22 engaging a slot 37 provided therefor in the block 34. The type bars 12 are normally positioned one space below the printing line on the platen 10, and are normally restrained from rising above the cipher printing position by means of a detent plate 38 fixed on the frame 15. Mounted on the bracket 31 are rollers 39 engaging in a channel 40. The channel 40 extends transversely in the frame 15 and is mounted for forward and rearward movement on a plate 41 forming part of the frame by means of studs 42 and slots 43 provided therefor. Links 44 connect the channel 40 and a bracket 45 fixed on a yoke 46. The yoke 46 is pivoted on a shaft 47 rigid in the frame 15, is positioned laterally thereon by the frame and a set screw collar 48, Figure 3, and is tensioned to rock clockwise about the shaft 47 by means of a spring 49, to urge the rear end of the slots 32 in the bracket 31 to bear against the studs 33 and position the vertically disposed rods 18 normally under the control of the plate 38 and the stops 14. Ears 50 forming part of the channel 40 rest on the shaft 47 to support the channel and facilitate its free and easy movement on the studs 42, in the manner and for the purpose to be later described.

Upon the entering of an amount in the amount keys 17 and the consequent moving of the stops 14 into the path of movement of the rods 18, the swinging arm 22 is swung from left to right, Figure 3, by means of a substantially strong spring (not shown), under the control of an indexing mechanism such as is shown in Figures 6 and 42 of the Sundstrand patent referred to. During the indexing movement of the swinging arm 22, the pin 36 therein moves the block 34 along the shaft 47, with the rollers 39 riding in the channel 40, carrying the block 30 with it to expose the vertically disposed rods 18 to the control of the stops 14 in the proper numerical order of the amount entered in the amount keys 17.

The type bars 12 carry racks 51 and 52 for co-operation with totalizer adding wheels 53 in the manner described in the patent referred to. In general, the wheels 53 contain 20 teeth and are arranged for engagement with the racks 51 for addition, and with the racks 52 for subtraction under the control of the keys in the keyboard manually, or the control of the traveling paper carriage automatically. Each wheel 53 is provided with lugs 54 which act upon transfer devices 55 and 56 to transfer amounts from one order to another during an item-entering operation of the machine, and to control the movement of the type bars 12 to printing position during total-taking operations thereof. Normally the wheels 53 remain engaged with their associated racks at the completion of an operation of the machine.

The machine is actuated by an electric motor (not shown), which is started by the closing of a suitable switch mechanism, and is coupled with an actuating shaft (not shown), by a suitable clutch mechanism, either manually upon the depression of a motor bar (not shown), or automatically under the control of the traveling paper carriage. The actuating shaft is connected with the motor drive in such a manner that it is rocked first counterclockwise, and then clockwise, when viewing the machine as it is illustrated in Figure 1, through an arc of about 90° during each operation of the machine.

During an item entering operation of the machine, as the actuating shaft is rocked counterclockwise, the wheels 53 are disengaged from the racks 51 or 52 and the type bars 12 carrying rods 18 exposed to the control of the stops 14 are permitted to rise to abut the stops and position the type for printing the amount set up on the amount keys. Upon the start of the return or clockwise rocking of the actuating shaft, hammers (not shown), are released to strike the type 11 and imprint it on the work pieces. As the rocking of the actuating shaft continues, the hammers are restored and the wheels 53 are engaged with the racks 51 or 52, and the type bars 12 are restored to their normal or lowered position to add or subtract the amount printed as a debit or credit respectively in the totalizer. Also, during the rocking of the actuating shaft, the swinging arm 22 and the rods 18 are returned to their normal position, as shown in Figure 3, while a cam edge 57 provided on an upstanding bar 57a carried by the block 30 cams on the rounded end of the extended stops 14 and restores them to their normal position, by means shown in the Sundstrand Patent 2,194,270 referred to. These means include a link 58, Figure 3, connecting the swinging arm 22 and a bell crank 59 pivoted at 60 on the machine base 16. Pivoted on the bell crank 59 is a lever 61 extending rearwardly on the machine. Pivoted at 62 on the machine base is a lever 63 carrying a stud 64 against which the lever 61 is tensioned by a spring 65. A lever 66, rigid on the machine actuating shaft (not shown), when the machine is in its unoperated condition, bears on a lug 67 on the lever 63, to rock the lever 63 about its pivot 62 and cause the stud 64 therein to pivot and hold the lever 61 clear of its path of movement, so that, during the entering of an amount in the keys 17 and indexing of the swinging lever 22, the lever 61 can move rearwardly upon the pivoting of the bell crank 59 by the link 58. Upon the forward or counterclockwise rocking of the actuating shaft, the lever 66 moves away from the lug 67 on the lever 63, whereupon the spring 65, acting on the lever 61 bearing on the stud 64, rocks the lever 63 about its pivot 62 to stop against a stop 68 in the machine base and position the lever 61 in the path of movement of the lever 66. During the return or clockwise rocking of the actuating shaft, the lever 66 strikes and moves the lever 61 forwardly, to pivot the bell crank 59 and, by means of the link 58, restore the swinging arm 22 to its normal position.

The disclosed machine is capable of performing total and sub-total operations. Since the sub-total controls actuate total control member 91 and in addition disable the totalizer disengaging mechanism in the manner described in Patent No. 2,194,270 above, no distinction need be made between these two operations so far as the present invention is concerned.

During a sub-totalling or totalling operation of the machine, the wheels 53 remain engaged with their associated racks during the rise of the type bars 12 and are rotated by the racks until they return to zero, and the lugs 54 thereon abut the transfer members 55 or 56 to arrest the type bars in printing position. During this movement of the type bars 12, the stops 14 must be ineffective to arrest bars 12 and so cause an incorrect total to be printed. In prior machines, it has been necessary to move the rods 18 to the Figure 3 position prior to taking a total to prevent such interference and in such position, cam 57a has restored any set pins 14 to their unset position. Hence it has not been possible to retain an amount set up on stops 14 during a total-taking operation.

The present invention provides means whereby a sub-total or total of the totalizer may be printed while retaining the amount entered in the numeral keys 17. To this accomplishment the vertically disposed rods 18 are moved to a position where the rising of the type bars 12 is uncontrolled by the detent plate 38 and stops 14 and is controlled by the lugs 54 in the totalizer wheels 53 acting upon the transfer devices 55 or 56, during a total-taking operation of the machine. To do this a lever 85 is fixed to the yoke 46, said lever having a leg 86 engageable by a lever 87 pivoted at 88 on the machine base 16. An extension 89 of the lever 87 rests in front of a lug 90 forming part of a member 91 mounted for movement forwardly in the machine either manually upon the depression of a total key 92 to rock a cradle 93 connected at 94 with the member 91 or automatically under the control of the traveling paper carriage, to condition the machine for total-taking, in the manner described in the patent referred to, said member 91 being returned to its normally rearward position by means of a spring (not shown). During the forward movement of the member 91, the lever 87 is moved about its pivot 88 by the lug 90 to strike the leg 86 of the member 85 and rock the yoke 46 counterclockwise about the shaft 47; while the links 44, cooperating with the rollers 39 riding in the channel 40, move the bracket 31 rearwardly until the front end of the slots 32 provided therein bear against the studs 33 and position the vertically disposed rods 18 to the rear of and clear of such of the stops 14 which were extended by the entering of an amount in keys 17, as illustrated in Figure 2. With the rods 18 so positioned, the type bars 12 are free to rise to print the sub-total under the control of the lugs 54 in the totalizer wheels 53. During the restoration of the type bars 12 to their normally lowered position, the wheels 53 remain engaged with their associated racks 51 or 52 to return the wheels to their initial position and retain the amount set up in the totalizer for totalling. Also, during the return of the type bars, the member 91 is spring returned to its rearward position, enabling the spring 49 to return the rods 18 to the control of the detent plate 38 and the stops 14.

A specimen of the work which may be performed on the present machine is illustrated in Figure 5. A journal sheet (or tally roll) 69 is rear fed into the traveling paper carriage and a statement sheet 70 is front fed in front of the journal with carbon paper supported therebetween. Adjacent and to the right of the statement, a ledger 71 is front fed into the carriage. An old balance, say $100.00 is entered, printed on the journal and accumulated in the totalizer, and the carriage is tabulated to the debit printing column where the debit $5.00 is entered in the amount keys and retained for repeat printing by means such as described in the patent referred to. These means include a repeat key 72 supported for vertical slidable movement in the machine frame and arranged to be latched in its depressed position. The key 72 overlies a bevel 73 provided on a lever 74 slidably supported at 75 on the machine base, said lever being connected at 76 with a lever 77 pivoted at 78 on the machine base. Upon the depression and latching of the repeat key 72, its lower end, camming on the bevel 73, forces the lever 74 leftwardly to pivot the lever 77 clockwise, whereupon an extension 79 thereof strikes a formed lug 80 on the lever 63 and holds the lever 63 in its normally pivoted position, and where the stud 64 therein holds the lever 61 out of the path of movement of the lever 66, thereby preventing the restoration of the stops 14. Similarly, the restoration of the stops 14 is prevented automatically by the movement of a lever 81 rearwardly by an automatic control actuated by the paper carriage in the manner described in the patent referred to, in which case a pin 82 therein strikes an extension 83 of the lever 63 and holds it in its normally pivoted position. With the amount entered in the amount keys, the machine conditioned for repeat printing in the manner described, and the date entered for repeat printing on the date keys, in the manner described in the patent referred to, the motor bar (not shown), is depressed to cycle the machine to print the amount and date simultaneously on the statement 70 and journal 69 and add the amount in the racks 51 of the totalizer as a debit. Should the amount entered be a credit, the carriage is first positioned in the debit column and the date printed with the amount printing bars non-printed, then the carriage is tabulated to the credit column where the credit amount is set up and printed, the amount being then subtracted from the wheels 53 of the totalizer on the return of the bars 12 to home position. The carriage is then automatically tabulated to the new balance column, in which column the new balance is printed as a sub-total of the totalizer.

Having thus obtained original printing of the various amounts on the statement, the machine carriage is tabulated automatically to obtain duplicate original printing on the ledger 71. It is first tabulated to the debit printing column. In this column the date is repeat printed simultaneously with the printing of the debit amount, and is cleared from the date keys in the manner described in the patent referred to. If the amount is a credit, the amount type bars are again non-printed and the credit amount is printed in a separate cycle in the credit column. Since this is the last printing of an amount entered in the keys 17 in the posting of an individual transaction, further printing of the amount, either debit or credit, is undesired, and the machine is not conditioned either manually or automatically therefor, rendering the spring 65 effective to move the lever 61 into the path of movement of the lever 66. Therefore, in the ledger sheet column, th amount is printed under the control of the stops 14, is non-added in the totalizer and the stops 14 are restored to their normal position by means of the lever 66, after which the carriage is tabulated to the last and final printing column for printing of the new balance as a grand total of the totalizer. During the operation of the machine, the rods 18 are moved to their rearward position upon the conditioning of the machine for totalling, and are returned to the control of the detent plate 38 and stops 14, in the manner previously described for printing the new balance as a sub-total on the statement.

The present device is also capable of being adjusted to permit indexing of a new amount during a total or sub-total cycle. Normally, the operation of lever 66 on lever 61 will, during a total cycle, restore the stops 14 as described unless the repeat key 72 has been depressed. If, however, the carriage controls are so set as to operate lever 61 during the total cycle, an amount indexed on the keys 17 will not be destroyed at the end of this cycle and may be entered by cycling the machine in the customary manner.

It will be understood that numerous changes may be made in the construction herein disclosed without departing from the scope of the appended claims, and that the machine may be operated in various ways to produce various classes of work.

What is claimed is:

1. In a machine of the class described having, in combination, cycling means, a keyboard, a group of stops having their ends in a common plane and settable by keys in said keyboard, a plurality of type bars, means normally operative by said cycling means to advance and restore said type bars, a totalizer, a total key, means slidably connected to said type bars, said slidable means being normally engageable with said set stops to limit the movement of said type bars, a frame, a stop fixed in said frame and normally engageable by said slidable means when none of said stops are set by said keys, means for moving said slidable means seriatim from control by said fixed stop to control by said set stops, a bracket in which said slidable means are freely movable by said type bars, means mounting said bracket in said frame for movement of said bracket and said slidable means away from said fixed stop and said set stops in a direction perpendicular to the direction of movement of said type bars and to the direction in which said slidable means are moved when released from control by said fixed stop, and connections from said bracket to said total key for moving said bracket and said slidable means in said perpendicular direction to a position wherein said fixed stop and said set stops are ineffective to control the movement of said type bars.

2. A machine of the class described having, in combination, cycling means, a group of keys, a plurality of rows of key settable stops, a fixed stop, a plurality of type bars movable by said cycling means and normally controlled in one direction of movement by said stops, a totalizer, a total key, means slidably connected to said type bars, a frame, a lateral channel member in said frame, means mounting said channel member for movement in a direction parallel to the movement of said stops when they are set, a bracket laterally movable in said channel member and supporting said slidably connected means for movement into engagement with said stops, key operated means for moving said bracket and said slidably connected means laterally in said channel member, connections from said total key to said channel member to move said channel member and thereby move said bracket and said slidably connected means to a position wherein said stops are ineffective to arrest said slidably connected means and said type bars, and means operative upon release of said total key to restore said slidably connected means into effective position with respect to said stops.

3. In a machine of the class described, the combination of a keyboard, a plurality of rows of stops settable seriatim by keys in said keyboard, a computing mechanism normally controllable by the set stops of said rows of stops, slidable means connected to said computing means and engageable with said set stops, a frame, a bracket movable laterally in said frame under control of said keys and supporting said slidable means for movement by said computing means into engagement with said stops, means for moving said slidable means from the control of said stops while said stops remain set and with said slidable means in any position laterally in said frame, said means comprising a channel movable in said frame and connected to said bracket, a yoke pivoted in said frame, links connecting said channel and said yoke, a manually settable key to rock said yoke and move said slidable means from control by said stops, and spring means for returning said slidable means to control by said stops upon the release of said key.

4. An accounting machine of the class described comprising a frame, cycling means, a plurality of type bars movable from and to a home position by said cycling means, a keyboard, a plurality of parallel banks of stops settable seriatim by the keys of said keyboard to project one end of selected ones of said stops to an effective position, a fixed stop associated with said banks of stops, members slidably connected to said type bars and cooperative with the projected stops of said banks of stops and said fixed stop to differentially limit the movement of said type bars from home position, keyboard controlled means to relatively shift said stops and said slidably connected members, a cyclically operated restoring mechanism to restore said relatively shifted stops and slidably connected members to an original position, manually operable repeat control means to enable retention of said stops and said slidably connected members in any relative position during a plurality of operations of said cycling means, an accumulator, a total control member, cyclically operated means to engage said accumulator with said type bars to enable said accumulator to differentially limit movement of said type bars from home position to a total representing position, a guide member carrying said slidably connected members, members on said frame for supporting said guide member for movement toward and away from a position wherein said slidably connected members are not engageable with said set stops or said fixed stop in any relative position of said slidably connected members and said stops, and means operated by said total control member, when operated to enable a total to be taken, to shift said guide and said slidably connected members carried thereby into said non-engaging position, whereby only said accumulator is effective to limit movement of said type bars away from the home position in any relative position of said slidably connected members and said stops.

WALTER A. ANDERSON.

References Cited in the file of this patent

UNITED STATES PATENTS

| Number | Name | Date |
|---|---|---|
| 2,194,270 | Sundstrand | Mar. 19, 1940 |
| 2,309,293 | Anderson | Jan. 26, 1943 |
| 2,568,350 | Mehan | Sept. 18, 1951 |